United States Patent
Albrecht et al.

(10) Patent No.: US 11,669,075 B2
(45) Date of Patent: Jun. 6, 2023

(54) AUTOMATION DEVICE, COMPUTER PROGRAM, COMPUTER-READABLE MEDIUM AND METHOD FOR AUTOMATICALLY CONFIGURING AN AUTOMATION DEVICE

(71) Applicant: Siemens Aktiengesellschaft, Munich (DE)

(72) Inventors: Harald Albrecht, Nuremberg (DE);
Stephan Höme, Schwabach (DE);
Thomas Talanis, Heroldsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 63 days.

(21) Appl. No.: 17/434,544

(22) PCT Filed: Mar. 3, 2020

(86) PCT No.: PCT/EP2020/055492
§ 371 (c)(1),
(2) Date: Aug. 27, 2021

(87) PCT Pub. No.: WO2020/200606
PCT Pub. Date: Oct. 8, 2020

(65) Prior Publication Data
US 2022/0137605 A1    May 5, 2022

(30) Foreign Application Priority Data
Mar. 29, 2019 (EP) ..................... 19166203

(51) Int. Cl.
*G05B 19/418* (2006.01)
*G05B 15/02* (2006.01)

(52) U.S. Cl.
CPC ....... *G05B 19/41845* (2013.01); *G05B 15/02* (2013.01); *G05B 19/41835* (2013.01);
(Continued)

(58) Field of Classification Search
CPC .............. G05B 19/41845; G05B 15/02; G05B 19/41835; G05B 2219/23255;
(Continued)

(56) References Cited

U.S. PATENT DOCUMENTS 11,394,572 B2 * 7/2022 Pognant .............. H04L 12/2827
2008/0301153 A1 12/2008 Greer et al.
(Continued)

FOREIGN PATENT DOCUMENTS

| CN | 1685342 | 10/2005 |
|----|---------|---------|
| CN | 103348351 | 10/2013 |

(Continued)

OTHER PUBLICATIONS

PCT International Search Report dated Jun. 17, 2020 based on PCT/EP2020/055492 filed Mar. 3, 2020.
(Continued)

*Primary Examiner* — Mohammad Ali
*Assistant Examiner* — Sheela Rao
(74) *Attorney, Agent, or Firm* — Cozen O'Conner

(57) ABSTRACT

Automation device, computer program, computer-readable medium and method for automatically configuring an automation device, wherein a) an automation device is provided, b) a device management unit monitors whether an automation identifier is assigned to the automation device, c) upon identifying an assignment of this kind, the device management unit queries a central cluster management unit to determine whether a description object, in which the automation identifier assigned to the automation device is stored, already exists in a cluster state database belonging to the
(Continued)

cluster containing description objects for nodes of the cluster, d) if no such description object yet exists, or if such a description object does exist but has been declared inactive, then the device management unit creates, in the cluster state database for a node identifier assigned to the automation device, a description object in which the automation identifier assigned to the automation device is stored.

18 Claims, 3 Drawing Sheets

(52) U.S. Cl.
CPC .............. *G05B 2219/23255* (2013.01); *G05B 2219/25011* (2013.01); *G05B 2219/25061* (2013.01)

(58) Field of Classification Search
CPC ........... G05B 2219/25011; G05B 2219/25061; G05B 2219/31334; Y02P 90/02; H04L 41/0893
See application file for complete search history.

(56) References Cited

U.S. PATENT DOCUMENTS

| | | |
|---|---|---|
| 2010/0094433 A1 | 4/2010 | Lessmann |
| 2012/0143887 A1 | 6/2012 | Fontenot et al. |
| 2012/0143892 A1 | 6/2012 | Fried et al. |
| 2012/0167184 A1 | 6/2012 | Vanderveen et al. |
| 2013/0212238 A1 | 8/2013 | Biehler et al. |
| 2016/0330168 A1 | 11/2016 | Albrecht et al. |
| 2017/0147372 A1 | 5/2017 | Cudak et al. |
| 2017/0222875 A1 | 8/2017 | Neria et al. |
| 2018/0077109 A1 | 3/2018 | Hoeme et al. |

FOREIGN PATENT DOCUMENTS

| | | |
|---|---|---|
| CN | 106131231 | 11/2016 |
| CN | 106775920 | 5/2017 |
| CN | 107835265 | 3/2018 |
| CN | 108694230 | 10/2018 |
| DE | 102007025892 | 12/2008 |
| EP | 2629164 | 8/2013 |
| EP | 2996311 | 3/2016 |
| EP | 3267351 | 1/2018 |
| EP | 3385867 | 10/2018 |

OTHER PUBLICATIONS

Bias, Randy "The History of Pets vs Cattle and How to Use the Analogy Properly", Cloudscaling, p. 1-6, 2016.
Production-Grade Container Orchestration: Automated Container Deployment, Scaling, and Management, Kubernetes, pp. 1-6 2021.
P. Hoffman et al., Internet Engineering Task Force (IETF), RFC 7719, "DNS Terminology", pp. 1-27, 2015.
"Rkt Topics Page: What is rkt?", Cloud Native Computing Foundation (CNCF), pp. 1-2, 2021.

* cited by examiner

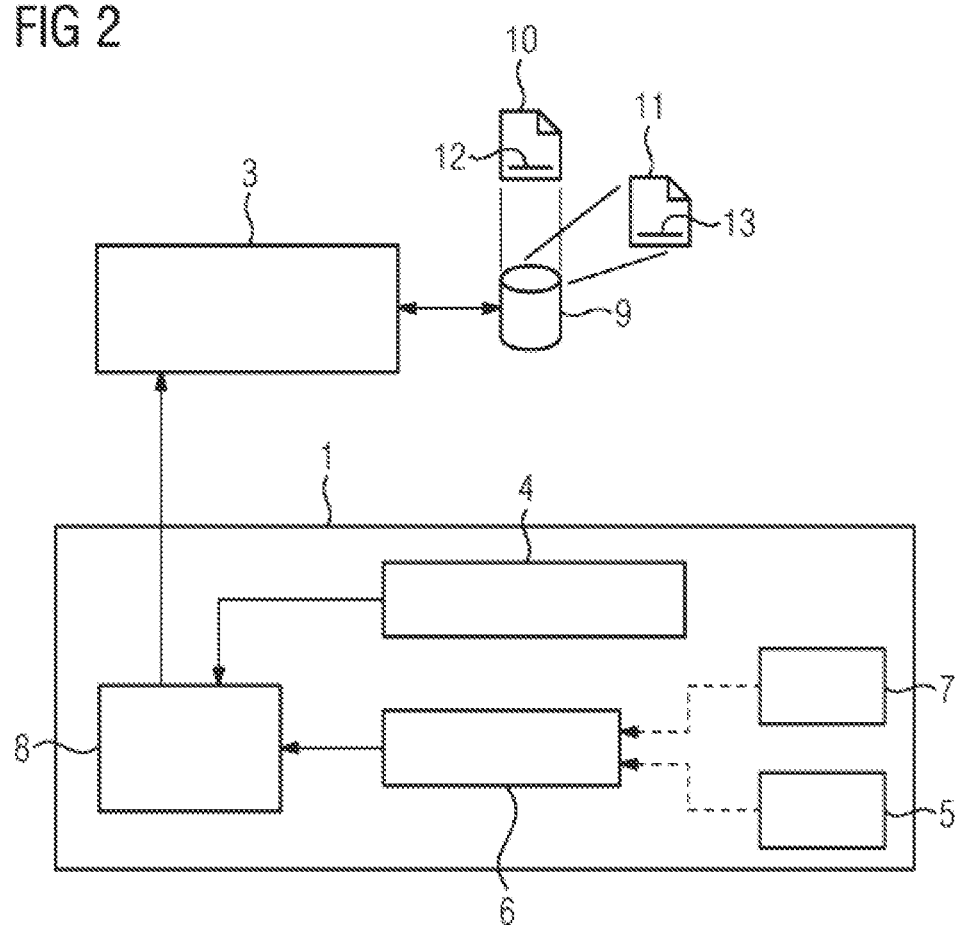

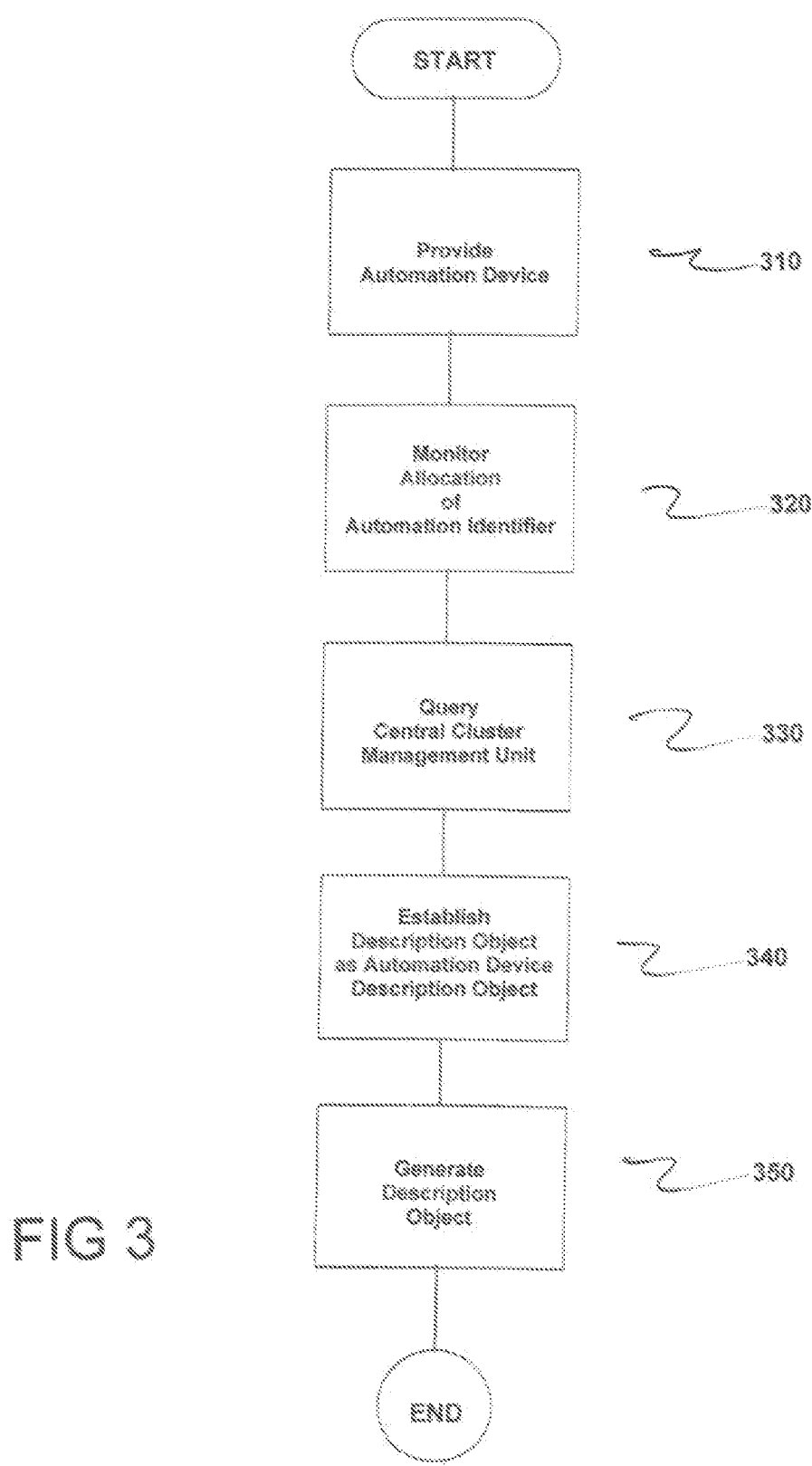

AUTOMATION DEVICE, COMPUTER PROGRAM, COMPUTER-READABLE MEDIUM AND METHOD FOR AUTOMATICALLY CONFIGURING AN AUTOMATION DEVICE

CROSS-REFERENCE TO RELATED APPLICATIONS

This is a U.S. national stage of application No. PCT/2020/055492 filed Mar. 3, 2020. Priority is claimed on European Application No. 19166203.3 filed Mar. 29, 2019, the content of which is incorporated herein by reference in its entirety.

BACKGROUND OF THE INVENTION

1. Field of the Invention

The invention relates to an automation device, a computer program, a computer-readable medium and a method for automatically configuring an in particular industrial automation device.

2. Field of the Invention

In the field of networks, in particular industrial networks, the name of the network subscribers is increasingly gaining a central role in the identification of devices and the identification of functions and the like. For a long time, the industrial Ethernet standard for automation, i.e., PROFINET, has used such names for the leading identification in particular of IO devices, and not, for instance, IP addresses.

Especially in the event of a device constituting a network subscriber being exchanged, when names instead of IP addresses are used for identification purposes, it is particularly important for the exchanged device, which is still empty, to receive its correct, unique name as quickly as possible. This process is also referred to as "baptizing" in particular in the context of PROFINET. In the event of a device exchange, a rapid "re-baptism" is thus desirable or required.

One option for "baptizing" devices is via a "topological" baptism that is based in principle on the network wiring of the devices.

The applicant is aware that a (quasi-)centralized form of topological baptism is implemented in PROFINET. Here, in the course of planning an automation application using an engineering tool, the network interconnection of the automation devices is also acquired. From this interconnection of the devices in conjunction with the device names, the planning tool calculates a list of "alias names". In this case, a particular device has at most as many alias names as it has Ethernet ports. An alias name consists of a port name to which the device name of the neighbor is appended. For a port having the port name "port001" and a device name "io-2.hall1.acme.com", "port001" plus "io-2.hall1.acme.com" would, for example, then result as an alias name for the device "io-3.hall1.acme.com" connected to the port "port001".

The individual devices, as soon as they have been introduced into a network, find out the names of their neighbors via the Link Layer Discovery Protocol (LLDP), which is defined in particular in Institute of Electrical and Electronics Engineers (IEEE) 802.1AB. According to the abovementioned "port name plus name of the neighbor device" rule, each as yet unbaptized device can then calculate its alias name. The individual devices in this case do not know the alias name list. The alias name list is known only to the central planning tool that calculated it.

The planning tool must load the alias name list into a PROFINET IO controller (IOC). Based on the loaded list, the IO controller then constantly attempts to find as yet unbaptized devices on the basis of their alias name. If one or more as yet unbaptized devices are found on the basis of the alias name, these are baptized with the name that was assigned beforehand to the respective alias name in the planning tool. In the context of IPv4, various IPv4 parameters are additionally often also assigned, such as IPv4 address, network mask, or default gateway.

The topological baptism provided in PROFINET always requires a (quasi)-central IO controller that traces unbaptized devices and then baptizes them.

In automation technology, automation devices may be functionally named using the PROFINET "name of station" (NoS), for example, with an AKZ or KKZ name (AKZ in this case represents installation designation system, see for example DIN6779, and KKZ represents power plant designation system, see for example, VGB-105, VGB-B 106, IEC/DIN EN 61346 or ISO 16952). Industrial users are tasked, as part of their working processes, "to baptize" automation devices in this way. Specifically for a device exchange, there are methods for assigning the name of station automatically to the replacement device following connection thereof to the network without further manual intervention. In the "PROFINET topological baptism", PROFINET controllers (in particular programmable logic controllers (PLC)) are obliged to give the correct names to the automation devices allocated thereto.

European patent application no. 18188735.7, likewise stemming from the applicant, furthermore discloses a method for decentralized self-baptism with the aid of the domain name system (DNS, see in particular RFC 1034 and 1035).

In the general IT sector, in particular in an office environment, the Dynamic Host Configuration Protocol (DHCP) (see Request for Comments (RFC) 2131 "Dynamic Host Configuration Protocol" and RFC 3315 "Dynamic Host Configuration Protocol for IPv6 (DHCPv6)" from the Internet Engineering Task Force (IETF)) is often used. This likewise makes it possible to assign a "host name" (device name) to a device. Here, however, it is considered to be partially disadvantageous that DHCP uses the hardware network address (MAC) of a device as a unique key. If a device is exchanged, then the MAC address also changes, meaning that an automatic baptism would cause great administrative outlay.

What is known as container technology has also proven successful in the field of general IT. Application containers generally constitute "encapsulated" units that can be executed independently of one another, regardless of where they are located. Similarly to virtual machines, containers are a kind of container for applications, in which they can run. While virtual machines, however, form a complete computer environment, the containers usually contain only important data required for executing the respective application or applications.

Container technologies or containerization make it particularly possible to package software or an application into a container containing everything it needs to run, for example, program code, runtime, system tools and/or system libraries. Container technologies or containerization make it possible to package and to transport functions easily and conveniently in a modular manner and ultimately to roll them out in the operative field. Conventional fields of use for containers are, for example, those of packaging applications, for instance a database or a web front-end, in a convenient manner.

Examples of software for container virtualization/containerization are for instance "Docker" or "rkt" (pronounced "rocket", see for instance EP 3 267 351 A1 with regard to Docker). One example of an orchestration system or orchestration software for containers is given by "Kubernetes".

The applicant believes that container virtualization also has great potential in the field of automation technology.

One important innovation in conventional data center IT is that of effective and efficient orchestration of software containers in clusters: in this case, orchestration software, such as for example Google's Kubernetes, ensures that the workload is distributed among the available working nodes in the form of software containers. The container and node availability is furthermore also checked, and disrupted containers are for example restarted automatically.

The nodes of a data center cluster are in this case largely interchangeable workers. To distribute the work, the (device) identity of an individual worker/node usually does not play any role. The expression "cattle, not pets" is also used in connection with the fact that nodes (workers) are interchangeable and replaceable.

In contrast to data center clusters (set up remotely from an industrial installation), industrial edge devices, in accordance with the definition of "edge" (see, for example, WIKIPEDIA—Edge Computing), as counterpart to the cloud, are located in an installation close to the (conventional) automation devices, in particular "at the edge" of an installation or a network thereof.

Certain workloads (containers) are no longer necessarily able to be assigned freely to arbitrary working computers in the cluster in the case of automation technology tasks. On the contrary, the workloads of particular system-specific functions even have to be able to be assigned to the associated installations and, for example, to edge devices belonging thereto.

On the one hand, users of industrial automation technology have already been working with installation designation systems (AKZ, and/or KKZ) for decades and are well-versed with unambiguously identifying functions. On the other hand, users in Kubernetes may, for example, provide nodes (workers) and workloads (containers) with what are known as "labels" that would make it possible to selectively allocate workloads to workers. The Kubernetes orchestration system makes it possible, for example, for cluster nodes, which may be formed, for example, by edge devices, to be provided with "labels". Filtering may be then performed onto the labels in a targeted manner during the allocation of function-specific workloads in order to assign a particular container function to only a single or else to a set of nodes/edges. The assignment of such labels to nodes/edges is in this case purely within the scope of the user.

In the case of the expected high number of automation devices, for example, edge devices, in industrial installations, the applicant assumes that manual "labeling" will quickly become uneconomical and susceptible to errors when a large number of automation technology functions need to be assigned to a large number of edge devices. Users would additionally actually experience a double label, i.e., first from the point of view of the automation technology and then from the point of view of the orchestration.

In addition to avoiding double work, automatic (self)-baptism mechanisms, following a device exchange, should also be able to use the orchestration to guarantee fast and problem-free baptism of defective industrial edge hardware, for example, the decentralized self-baptism according to European patent application no. 18188735.7 stemming from the applicant.

SUMMARY OF THE INVENTION

In view of the foregoing, it is an object of the present invention to provide an option for allocating specific tasks to automation devices, forming nodes of a cluster, with little effort, in particular including in the case of a device exchange.

This and other objects and advantages are achieved in accordance with the invention by a method for automatically configuring an in particular industrial automation device, comprising the following:
  a) an automation device that is suitable for functioning as a node of a cluster and for executing at least one automation task is provided,
  b) a device management unit monitors whether an automation identifier is allocated to the automation device,
  c) when the device management unit has identified such an allocation has occurred, the management unit queries a central cluster management unit to determine whether a description object already exists in a cluster state database associated with the cluster and containing description objects for nodes of the cluster, where the description object stores the automation identifier allocated to the automation device,
  d) in the event that such a description object already exists for a node identifier allocated to the automation device, this description object is considered to be a description object of the automation device, and in the event that such a description object exists for a node identifier other than the one allocated to the automation device and is declared as inactive and in the event that no such description object yet exists, the device management unit generates a description object in the cluster state database for the node identifier allocated to the automation device, where the description object stores the automation identifier allocated to the automation device, or stores the automation identifier allocated to the automation device in a description object that already exists for a node identifier allocated to the automation device in the cluster state database or initiates the storage or the generation.

The automation identifier is preferably removed from an "old" description object containing the allocated automation identifier that is declared as "inactive", or the entire "inactive" description object is removed. The database can thus be kept up-to-date.

In the event that such a description object declared as "active" already exists in the database, the storage of the automation identifier or the generation of a new description object is expediently eschewed. In one expedient embodiment of the method in accordance with the invention, in the event that the query about whether a description object already exists in the cluster state database associated with the cluster, this description object storing the automation identifier allocated to the automation device, reveals that this is the case and this description object is declared as active, the device management does not generate any description object storing the automation identifier allocated to the automation device in the cluster state database for a node identifier allocated the automation device, and also does not store the automation identifier allocated to the automation device in a description object that already exists for a node identifier allocated to the automation device in the cluster state database and also does not initiate the storage or the generation. A "device doublet" is thus in particular able to be identified and "dual usage" of an automation identifier can be prevented and associated problems can be avoided.

Following steps a) to d) of the method in accordance with the invention, conventional orchestration mechanisms, the workloads allocated to the automation device in particular by a user specifically through workloads allocated through automation identifiers, may be assigned specifically to this device. Download and deployment processes that occur in response thereto or expediently may run in the previously known manner, in particular as defined in known container systems, such as Docker. By way of example, the orchestration system instructs the container system on a working node to load a quite specific container image from a previously configured registry and then to execute it.

In one embodiment, at least one automation function is allocated to the automation device with recourse to the description object that was considered to be the description object of the automation device in step d) or that was generated in step d) or in which the automation identifier was stored in step d). Particularly preferably, at least one containerized automation function is allocated to the automation device with recourse to the description object.

As a result, the description objects that comprise the automation identifiers form the special automation technology feature that automation devices, for instance, in a production network do not always constitute devices able to be interchanged arbitrarily with one another, but rather these (also) have to perform automation-specific, for instance, production-specific tasks that cannot be performed by other automation devices and/or at another point. In this case, this is reliably guaranteed without requiring any manual intervention, for example, manual labeling or manual configuration by a user.

The use in accordance with the invention of automation identifiers in the description objects allows particularly simple allocation of device-specific or "location-dependent" automation functions, for instance, production functions, to the respective automation device on the basis of established identification systems from the field of industrial automation, such as AKZ, or KKZ.

The automation identifier and the node identifier of a device are expediently different from one another, i.e., not identical identifiers.

The automation identifier is preferably an identifier that is or has been issued to the automation device in connection with an automation technology task.

The node identifier is preferably an identifier that is or has been issued to the automation device in connection with its task or function as node of a cluster.

The description objects for the nodes in the cluster state database are in particular objects that describe the desired and/or current states of the nodes in the cluster. Such a description object is generally carried in a database for each node and describes the desired and/or current state of the respective node. A description object for a node may also be referred to as node object. In the context of Kubernetes, the description objects are, for example, also referred to as "resource objects" or simply "objects".

The method in accordance with the invention is particularly suitable for guaranteeing that exchanged and newly added automation devices that serve as cluster nodes are automatically allocated specific tasks in the cluster group or system. Associated description objects in a cluster state database and the identifiers are generated or maintained automatically.

For a newly added device, when it has been assigned an automation identifier, the automation identifier is initially stored in a description object in the cluster state database.

In particular for an exchange device, the check according to step c) may be used to determine whether the description object belonging to the "old" defective device has already been declared as "inactive". If this is the case, the automation identifier may in particular be stored in a (new) description object for the (new) device in the form of a label.

The check as to whether a description object storing the automation identifier allocated to the automation device already exists may reveal that such an object already exists for the node identifier allocated to the device, for instance, a node ID of the device. In other words, an object that is required for the device already exists. In this case, it is not necessary to generate any new object containing the automation identifier for the or using the node identifier, but rather the object that already exists in the required form may be used for the device. In this case, the description object is therefore considered to be a description object of the automation device. The description object should expediently be declared as active.

The method in accordance with the invention furthermore also covers the case that the automation identifier of a device, in particular inventory device, changes, i.e., a new automation identifier different from the previous automation identifier is allocated to a device. This is also identified by the device management unit and a corresponding update is initiated, taking into consideration the possibility that the new automation identifier has already been allocated, i.e., a description object containing it and declared as active exists.

In the event that the automation device has already (at least once) been allocated an automation identifier (previous identifier) and is then allocated a further automation identifier, provision may be made that the device management unit, after it has identified the allocation of the further automation identifier, contacts the central cluster management unit and prompts erasure of the (previous) description object storing the previous automation identifier. The database may thus be "cleared" or kept up-to-date.

In one particularly preferred embodiment, the automation device is an edge device. The method in accordance with the invention then in particular supports particularly easy initial commissioning and particularly convenient exchange of industrial edge devices. Manual configuration/database maintenance may be dispensed with.

The device management unit is preferably located on the automation device.

The central cluster management unit to which the request is made in step c) is preferably one that is responsible for distributing workloads among the nodes of the cluster. Reference may also be made to a cluster orchestration unit or cluster orchestration software. Kubernetes is mentioned purely by way of example for such orchestration software.

The device management unit may use the central cluster management unit to generate the description object or to store the automation identifier in same. The device management unit may, for example, transfer the automation identifier to the central cluster management unit and prompt the central cluster management unit to store it in an existing description object or to generate a new description object containing it.

The information as to whether a description object is active or inactive may in principle come from the cluster system itself, for instance, directly from the central cluster management unit, or else from another monitoring system that in particular performs independent monitoring of the cluster.

The automation device to be configured is in particular a new device or an exchange device or an inventory device whose automation identifier has changed. It may be necessary to change an automation identifier, for example, when an automation identifier has been input incorrectly, it contains, for example a "transposed letter", and therefore needs to be corrected. It may also be the case that an automation device has its function repurposed, for example, because it turns out that it does not have enough power, without it being removed from the orchestration system.

An identifier may also be referred to as a brand. The automation identifiers and the node identifiers may accordingly also be referred to as automation brands and cluster brands.

The allocation of the automation identifier may occur in the course of a baptism of the device or constitute same.

The allocation of an identifier to a device may include the fact that an identifier is assigned to the device and/or an identifier is received by the device and/or an identifier is stored on the device.

A device to which an identifier has not (yet) been assigned may be distinguished by an identifier file, in particular name file, stored on the device and still empty, or an identifier string, in particular name string, stored on the device and still empty. A device is in a state without an identifier, for example, before it has been put into operation for the first time in a network, such as in the delivery state.

It is emphasized that the order of the allocation of a node identifier and an automation identifier to a device may be arbitrary. In other words, the automation identifier may, for example, be allocated first, followed by the node identifier.

It is also possible for both identifiers to be allocated in the reverse order or else at the same time.

Another term for a cluster is computer cluster or computer group. The nodes of a cluster, which are formed, for instance, by multiple in particular connected computing devices/computers, are referred to as nodes. An automation device that is designed to be operated as a node of a cluster and to execute at least one automation task may be formed, for example, by a computing apparatus or a computer, such as in the form of an industrial PC that has at least one automation task to perform.

In a further embodiment of the method in accordance with the invention, the device management unit locally determines a node identifier allocated to the automation device.

As an alternative or in addition, the device management unit, in step d), addresses the description object that already exists for the node identifier allocated to the automation device or the description object to be generated or the existing description object in which the automation identifier is to be stored via a node identifier allocated to the automation device. It is thus particularly suitably possible to access an or the description object that describes the desired and current states of an automation device in the cluster.

In a further particularly preferred embodiment, the automation identifier is stored in the description object in the form of an or as part of a label. Mechanisms previously known per se from the prior art, in particular the previously known usage of labels, may thus continue to be used.

A node identifier that is assigned to the device is preferably a label, in particular one that is allocated by a central cluster management system or the central cluster management unit to the involved nodes of the cluster in order to identify them.

Labels that are formed by an automation identifier or node identifier or may comprise these preferably have the form key=value, wherein the key may have, for example, the structure "siemens.edge/name" and the value may be the (old or new) automation identifier, for instance FQDN.

Provision may furthermore be made that the automation identifier is allocated to the automation device by a further automation device, in particular a controller.

As an alternative or in addition, the automation identifier is allocated to the automation device using a self-baptism method, particularly preferably using the method, described in European patent application no. 18188735.7 likewise stemming from the applicant, for decentralized self-baptism with the aid of the domain name system (DNS, see in particular RFC 1034 and 1035). In one advantageous embodiment, the automation device may comprise a self-baptism unit that is configured to perform the self-baptism, in particular in accordance with European patent application no. 18188735.7.

Provision may furthermore be made that the automation identifier is allocated to the automation device using a setup tool. One example given of such a setup tool is the PROFINET Primary Setup Tool.

With regard to the form of the automation identifier, PQDNs or FQDNs have proven to be particularly suitable. In one development, provision may accordingly be made that a partially or fully qualified domain name (PQDN or FQDN) is allocated to the automation device as automation identifier. An only partially qualified domain name (PQDN), in contrast to an FQDN, does not comprise the full path of domain labels down to the DNS root. The automation identifier, in particular automation name, is preferably a (globally) unique identifier, in particular name. This may be a fully qualified domain name in the sense of RFC 7719 (Request for Comments: 7719 of the Internet Engineering Task Force Group (IETF).

It is also possible that an automation identifier comprises a name of station (NoS) or is formed by this. NoS are allocated as device names, for example, in the context of PROFINET, such as via a primary setup tool or a topological baptism.

As an alternative or in addition, a node identifier may be allocated to the automation device by the central cluster management unit. This corresponds to the conventional procedure.

It may be the case, for example, that, in step a), the automation device is provided as a new device and the automation device is incorporated into the cluster in the course of an on-boarding process, in particular by the central cluster management unit, and a node identifier is assigned to the automation device in the course of the on-boarding process, or the node identifier is assigned subsequently.

A node ID may, for example, be allocated to the automation device as node identifier.

Provision may furthermore be made that the automation device, in the course of provision thereof in step a), is connected to an in particular industrial automation network. Multiple nodes of a cluster are generally connected via a network.

It is also an object of the invention to provide an automation device that is suitable for functioning as a node of a cluster and for executing at least one automation task and that is configured to perform the method in accordance with the disclosed embodiments of the invention.

The automation device in accordance with the invention and/or an automation device that is configured to perform the method in accordance with disclosed embodiments of the invention may be, for example, a (separate) device or a (separate) hardware component that is configured to perform at least one automation function. It should be understood it is also possible that an automation device is present in the form of a "software automation device", such as in the form of a virtual machine (VM) or a computer program or a computer program compilation that is stored on an apparatus established to execute it/them, for instance, a PC or another computing apparatus or any other device. An automation device in accordance with the invention or to be configured may also be integrated into another device, both in the form of hardware and in the form of software.

The term automation device in the context of the present disclosure encompasses all of the abovementioned possibilities, in particular including "soft devices" and devices that actually execute other functions or serve another purpose, but are also able to perform an automation function and function as cluster nodes. By way of example, an automation device in the context of the present invention is also a conventional computer or PC or industrial computer or PC that executes or performs inter alia at least one automation function, for example, control function, and can serve or serves as the node of a cluster.

The automation device in accordance with the invention preferably comprises a device management unit that is to monitor whether an automation identifier is allocated to the device and, in the event that the allocation thereof is identified, to query a central cluster management unit to determine whether a description object comprising the automation identifier allocated in step c) already exists in a cluster state database associated with the cluster in which the device participates or is intended to participate as a node and containing description objects for nodes of the cluster, possibly for a node identifier other than the one allocated to the device, and in the event that no such description object yet exists or in the event that such a description object exists but is declared as inactive, to generate a description object comprising the automation identifier for a node identifier allocated to the automation device in the cluster state database or to store the automation identifier in a description object that already exists for a node identifier allocated to the device in the database.

The device management unit may constitute a functional unit that may be implemented, for example, on suitable hardware by a software component. The same applies to the central cluster management unit, which may likewise be formed by a functional unit and is formed for instance by software (for example, Kubernetes) that executes in particular on central hardware that the nodes are able to access.

In a further embodiment of the automation device in accordance with the invention, the automation device is configured to be allocated at least one in particular containerized automation function with recourse to a description object stored in a cluster state database associated with the cluster in which the device participates or is intended to participate as node.

In a further advantageous embodiment, the automation device in accordance with the invention has a self-baptism unit that is configured to perform a self-baptism or a self-baptism method, in particular the method, described in European patent application no. 18188735.7, likewise stemming from the applicant, for decentralized self-baptism with the aid of the domain name system (DNS, see in particular RFC 1034 and 1035).

It is a further object of the present invention to provide a computer program that comprises program code instructions for performing the steps of the method in accordance with disclosed embodiments of the invention.

It is also an object of the invention to provide a computer-readable medium comprising instructions which, when executed by a processor on at least one computer, prompt the at least one computer to perform the steps of the method in accordance with disclosed embodiments of the invention.

The computer-readable medium may be, for example, a CD-ROM or DVD or a USB or flash memory. It should be noted that a computer-readable medium should not be understood exclusively to be a physical medium, but rather it may also, for example, be present in the form of a data stream and/or a signal that represents a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear on the basis of the following description of inventive embodiments with reference to the appended drawings, in which:

FIG. 2 shows one of the automation devices from FIG. 1 and the central cluster management unit;

FIG. 3 is a flowchart of the method in accordance with the invention.

DETAILED DESCRIPTION OF THE EXEMPLARY EMBODIMENTS

Figure 1:
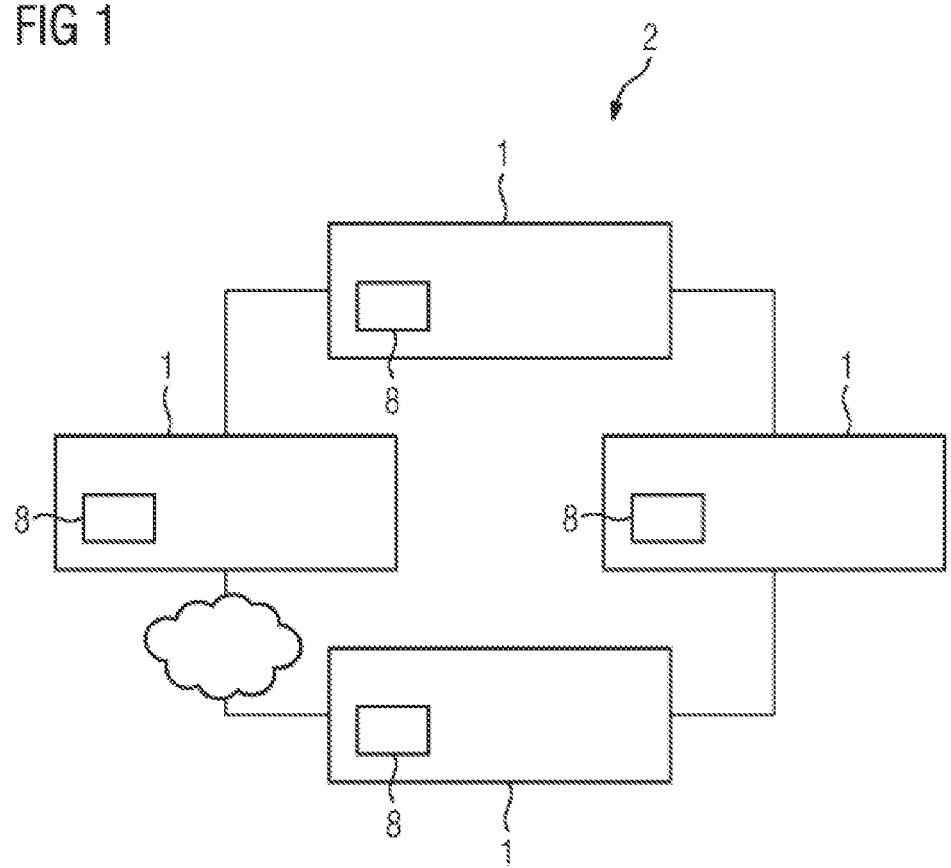
FIG. 1 is a partial schematic illustration of an industrial automation network containing multiple automation devices each forming a cluster node in accordance with the invention.

FIG. 1 shows a greatly simplified purely schematic partial illustration of an industrial automation network. Specifically, the automation network contains four automation devices 1 in the form of industrial PCs that each perform at least one automation function or automation task, specifically for an industrial technical process, here a production process, not illustrated in any more detail in the figures. The four devices all form components of an automation installation that comprises various further components, including conventional automation devices such as programmable logic controllers (PLCs), and/or IO devices, in a manner sufficiently previously known from the prior art, these not being illustrated in any more detail in FIG. 1. The cloud indicates that the devices 1 are connected, for example via Ethernet (in accordance with IEEE 802.3). Each of the four devices 1 furthermore constitutes an edge device that appears as a working node from the point of view of a cluster orchestration system and to which working tasks (in the form of containers) can be assigned.

Each of the four devices 1 functions as a node of a cluster 2 and performs particular workloads of the cluster 2 in the form of (software) containers. The workloads in the form of (software) containers include the respective at least one automation function or automation task. Here, the workloads of particular installation-specific functions are allocated to particular associated installation parts to each of which a particular industrial edge device 1 belongs.

A central cluster management unit 3, which is likewise illustrated only purely schematically in FIG. 2, serves to orchestrate the workloads of the cluster 2. The central cluster management unit 3 is responsible for distributing workloads among the nodes 1 of the cluster 2, i.e. (inter alia) among the automation devices 1. The central cluster management unit 3 is in this case a purely functional unit that is formed, in the example described here, by software, specifically Kubernetes. In this software, nodes 2 and workloads having node identifiers/node IDs 4 (see FIG. 2) may be provided in the form of "labels" that allow selective allocation of workloads to workers. It should be understood other orchestration software may also be used as a central cluster management unit 3 as an alternative to Kubernetes.

The automation devices 1 may, for example, be incorporated into the cluster 2 in the course of an on-boarding process performed by the central cluster management unit 3. The node identifiers 4 may then have been assigned or be assigned in the course of the on-boarding process or subsequently thereto.

It is then possible to filter workloads onto the allocated node identifiers or cluster labels 4 when allocating function-specific workloads to allocate a particular container function only to an individual or else to a set of nodes/industrial edge devices 1. According to the prior art, the assignment of such labels 4 to nodes/edge devices 1 is in this case purely within the scope of the user, and specifically must be performed manually.

Each of the four automation devices 1 furthermore comprises a self-baptism unit 5 that is configured to perform a decentralized self-baptism of the respective device 1 with the aid of the domain name system, as described in European patent application no. 18188735.7 likewise stemming from the applicant. By virtue of the self-baptism or the self-baptism method, the respective device 1 is allocated an automation identifier 6, which may be, for example, a fully qualified domain name (FQDN).

As an alternative or in addition to the device 1 receiving the automation identifier 6 via a self-baptism method, provision may also be made for it to be assigned this by another automation device, such as a controller, or for this to be allocated via a setup tool, for example, in the form of a name of station (NoS) 7. One example given for such a setup tool is the PROFINET Primary Setup Tool. FIG. 2 specifically indicates both possibilities, which generally constitute alternatives, by virtue of the fact that a respective dashed arrow is illustrated both from the self-baptism unit 5 and from the NoS 7 to the block element representing the automation identifier 6.

The automation identifier 6 is accordingly an identifier, in particular name, that has been allocated to the respective device 1 based on or in the scope of identification systems established from the field of industrial automation technology.

In particular in order to ensure that device-specific or "location-dependent" automation functions, such as production functions, can be allocated to the respective automation device 1 based on the established identification systems upon initial commissioning of an automation device 1 constituting a cluster node or upon exchange thereof, each of the automation devices 1 furthermore has a device management unit 8.

Following the provision of the respective device 1, for instance, connection thereof to the automation network and activation thereof (step a)) during operation of the respective device 1, the device management unit monitors whether the device is allocated an automation identifier 6 (length other than zero) that is different from the node identifier 4 (step b)). This monitoring captures both initial allocation of an automation identifier 6 and the case of an automation identifier 6 changing, i.e., already before an automation identifier 6 has been allocated, and a new automation identifier 6 is then allocated.

When the device management unit 8 has identified such an allocation, it queries the central cluster management unit 3 to determine whether a description object 10, 11 already exists for nodes 1 of the cluster 2 in a cluster state database 9 associated with the cluster 2 and containing description objects 10, 11, which description object stores the automation identifier 6 allocated to the automation device 1 (step c)).

It should be borne in mind that a distinction is drawn between the node identifier 4 and the original (now defective device 1) during a device exchange.

The description objects 10, 11 in the cluster state database 9 are those that describe the desired and current states of the nodes 1 in the cluster 2.

In the event that such a description object 10, 11, i.e., a description object 10, 11 in which the allocated automation identifier 6 is stored, in particular in the form of a label 12, 13, already exists for the node identifier 4 allocated to the automation device 1, and this description object is declared as active, then this description object 10, 11 is considered to be a description object 10, 11 of the automation device 1.

In the event that no such description object 10, 11 yet exists or in the event that such a description object 10, 11 exists for a node identifier 4 other than the one allocated to the automation device 1 and is declared as inactive, then the device management unit 8 generates a description object 10, 11 in the cluster state database 9 for the node identifier 4 allocated to the automation device 1, which description object stores the automation identifier 6 allocated to the automation device 1, or stores the automation identifier 6 allocated to the automation device 1 in a description object 10, 11 that already exists for the node identifier 4 allocated to the automation device 1 in the cluster state database 9 or prompts the storage or the generation.

The device management unit 8 may, for example, transfer the automation identifier 6 to the central cluster management unit 3 and prompt this unit to store it in an existing description object 10, 11 or to generate a new description object 10, 11 containing it (step d)).

The automation identifier 6 is in this case stored as part of a label 12, 13 in the description object 10, 11. This means that the label 12, 13 stored in the object 10, 11 in the database 9 comprises the automation identifier 6 and may also be understood to be or referred to as an automation label 12, 13. This is the case both in the event that a new description object 10, 11 is generated and stores the automation identifier and in the event that the storage occurs in an existing description object 10, 11.

In the example illustrated in FIG. 2, an "old" description object 10 already exists, this being declared as "inactive" and comprising an "old" label 12, and a "new" description object 11 containing a "new" label 13 comprising the automation identifier 6 is generated.

In such a case, i.e., when an old description object 10 declared as "inactive" has been found, the label 12 is preferably removed therefrom. It is also possible to completely remove the old, "inactive" description object 10. The database is thus automatically cleared of entries for defective devices and kept up-to-date.

The labels 12, 13 preferably have the form key=value. The key may, for example, have the structure "siemens.edge/name" and the value of the (old or new) automation identifier 6, such as FQDNs.

In this case, the device management unit 8 locally determines the node identifier 4 allocated to the automation device 1 and, in step d), addresses the description object 11 to be generated (or the existing description object 10), storing the automation identifier 6, via the locally determined node identifier 4 allocated to the automation device 1. The node identifier 4 may, for example, be determined locally by virtue of being queried by the device management unit 8. This may be achieved, for example, using a REST or RPC call via HTTPS.

The automation device 1 is then assigned at least one containerized automation function with recourse to the description object 11 that was generated in step d) (or in which the automation identifier 6 was stored in step d)), specifically at least one workload in the form of an automation function formed by a software container.

Previously known orchestration mechanisms, in particular of the central cluster management unit 3 (in this case Kubernetes) that are assigned to the automation device 1 by the user specifically through workloads in the form of containers assigned specifically through automation identifiers 6 and thus labels 13 and subsequent download and deployment processes may then run as usual.

As a result, this forms the special automation technology feature that automation devices 1, for instance, in a production network do not always constitute arbitrarily interchangeable devices 1, but rather these (also) have to perform automation-specific, such as production-specific tasks that cannot be performed by other automation devices 1 and/or at other points. This is reliably guaranteed in this case without requiring any manual intervention, for instance, manual labeling or manual configuration by user.

At least the following four cases are covered by the device management unit 8:

1. New device: for a new device 1 that was previously incorporated into the cluster through "on-boarding" and in the process received its own node identifier 4, after it has also received its automation identifier 6 (for example in the form of an NoS 7 or from the self-baptism unit 5), its automation identifier 6 is initially stored in the description object 11 in the form of or as part of the automation label 13.
2. Changing the automation identifier 6: in this case, the label 12, 13 in the description object 10, 11 is updated (with the then new changed automation identifier 6), taking into account the fault case of the new automation identifier 6 already having been allocated.
3. Device exchange: in this case, the "old" description object 10 of the old, defective device 1 is determined on the basis of the automation identifier 6 of the exchange device 1 and checked as to whether the associated description object has in particular already been marked by the central cluster management unit 3 as "inactive" (that is to say "defective" or "failed"). If this is the case, the automation identifier 6 of the new (exchange) device 1 may then be stored as automation label 13 in the new description object 11.
4. Device doublet: in this case, a description object 10 ("old") of an already present device 1 with the automation identifier 6 in the label 12 exists. This "old" description object 10 is additionally identified by the central cluster management unit 3 as "active" ("alive"). In this case, the automation identifier 6 is not transferred, that is to say neither removed from the "old" description object 10 nor transferred to the description object of the device doublet.

In the event that the automation device 1 has already (at least once) been allocated an automation identifier 6 (previous/"old" identifier) and is then allocated a further automation identifier 6 ("new" identifier), provision may be made that the device management unit 8, after it has identified the allocation of the further automation identifier 6, contacts the central cluster management unit 3 and prompts erasure of the (previous) description object 10 storing the previous automation identifier 6, in particular in the form of a label 12. The database 9 may thus be "cleared" or kept up-to-date.

It should be noted that, in the event that the query about whether a description object 10, 11 already exists for a node identifier 4 other than the one assigned the automation device 1 in the cluster state database 9 associated with the cluster 2, which description object stores the automation identifier 6 associated with the automation device 1, reveals that this is the case and this description object 10, 11 is declared as active, then the device management unit 8 does not generate any description object 10, 11 containing the automation identifier 6 in the cluster state database 9 for the node identifier 4 allocated to the automation device 1, and also does not store the automation identifier 6 allocated to the automation device 1 in a description object 10, 11 that already exists for the node identifier 4 allocated to the automation device 1 in the cluster state database 9, and also does not initiate the storage or the generation. This reliably avoids "dual occupancy" or "dual usage".

It should be furthermore noted that the four automation devices 1 illustrated by way of example in FIG. 1 all constitute exemplary embodiments of automation devices in accordance with the invention that are configured to perform the above-described an exemplary embodiments of the method in accordance with the invention. The sequences described above by way of example for an automation device 1 apply analogously to all of the automation devices 1 illustrated in FIG. 1.

The industrial network according to FIG. 1 is also an exemplary embodiment of a network according to the invention.

FIG. 3 is a flowchart of the method for automatically configuring an industrial automation device 1. The method comprises providing a) an automation device 1 that is suitable for functioning as a node of a cluster 2 and for executing at least one automation task is provided, as indicated in step 310.

Next, a device management unit 8 monitors b) whether an automation identifier 6 is allocated to the automation device 1, as indicated 320.

Next, the device management unit queries c), upon identifying such an allocation, a central cluster management unit 3 to determine whether a description object 10, 11 already exists in a cluster state database 9 associated with the cluster 2 and containing description objects 10, 11 for nodes 1 of the cluster 2, as indicated in step 330. Here, the description object stores the automation identifier 6 allocated to the automation device 1.

Next, the description object is considered d) as a description object of the automation device 1 in an event such a description object already exists for a node identifier 4 allocated to the automation device 1, as indicated in step 340.

Next, the device management unit 8 generates e) a description object 10, 11 in the cluster state database 9 for the node identifier 4 allocated to the automation device 1 in the event that such a description object 10, 11 exists for a node identifier 4 other than the description object 10, 11 allocated to the automation device 1 and is declared as inactive and in the event that no such description object 10, 11 yet exists, as indicated in step 350. In accordance with the invention, the description object (i) stores the automation identifier 6 allocated to the automation device 1, (ii) stores the automation identifier 6 allocated to the automation device 1 in a description object 10, 11 that already exists for a node identifier 4 allocated to the automation device 1 in the cluster state database 9 or (iii) initiates the storage or the generation.

Although the invention has been described and illustrated in more detail through the preferred exemplary embodiment, the invention is not restricted by the disclosed examples and other variations may be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for automatically configuring an industrial automation device, the method comprising:
   a) providing an automation device which is suitable for functioning as a node of a cluster and for executing at least one automation task;
   b) monitoring, by a device management unit, whether an automation identifier is allocated to the automation device;
   c) querying, by the device management unit, upon identifying such an allocation, a central cluster management unit to determine whether a description object already exists in a cluster state database associated with the cluster and containing description objects for nodes of the cluster, said description object storing the automation identifier allocated to the automation device;
   d) considering the description object as a description object of the automation device in an event such a description object already exists for a node identifier allocated to the automation device; and
   e) generating, by the device management unit, a description object in the cluster state database for the node identifier allocated to the automation device in the event that such a description object exists for a node identifier other than the description object allocated to the automation device and is declared as inactive and in the event that no such description object yet exists, said description object one of (i) storing the automation identifier allocated to the automation device, (ii) storing the automation identifier allocated to the automation device in a description object which already exists for a node identifier allocated to the automation device in the cluster state database and (iii) initiating the storage or the generation.

2. The method as claimed in claim 1, wherein at least one automation function is allocated to the automation device with recourse to the description object which was one of (i) considered to be the description object of the automation device during said considering the description object, (ii) which was generated during said considering the description object and (iii) in which the automation identifier was stored during said considering the description object.

3. The method as claimed in claim 2, wherein at least one containerized automation function is allocated to the automation device with recourse to the description object.

4. The method as claimed in claim 1, wherein, in the event that the query about whether the description object already exists in the cluster state database associated with the cluster, this description object storing the automation identifier allocated to the automation device, reveals that this is the case and this description object is declared as active, the device manager does not generate any description object storing the automation identifier allocated to the automation device in the cluster state database for a node identifier allocated to the automation device, and also does not store the automation identifier allocated to the automation device in a description object which already exists for a node identifier allocated to the automation device in the cluster state database and also does not initiate the storage or the generation.

5. The method as claimed in claim 1, wherein the automation device is allocated a further automation identifier, and the device manager, after identifying the allocation of the further automation identifier, contacts the central cluster management unit and prompts erasure of the description object storing the previous automation identifier.

6. The method as claimed in claim 1, wherein the device manager at least one of (i) locally determines a node identifier allocated to the automation device, and (ii) during said considering the description object addresses the description object which already exists for the node identifier allocated to the automation device, the description object to be generated or the existing description object in which the automation identifier is to be stored via a node identifier allocated to the automation device.

7. The method as claimed in claim 1, wherein the automation identifier is stored in the description object in as a label or as part of the label.

8. The method as claimed in claim 1, wherein the automation identifier is at least one of (i) allocated to the automation device by a further automation device, (ii) allocated to the automation device utilizing a self-baptism method and (iii) allocated to the automation device utilizing a setup tool.

9. The method as claimed in claim 8, wherein the further automation device comprises a controller.

10. The method as claimed in claim 1, wherein at least one of (i) a partially or fully qualified domain name is allocated to the automation device as automation identifier, (ii) a node identifier is allocated to the automation device by the central cluster management unit and (iii) a node ID is allocated to the automation device as the node identifier.

11. The method as claimed in claim 1, wherein during said query one of (i) the initial allocation of an automation identifier is identified and (ii) an allocation of a new automation identifier previously allocated to the automation device and different from an old automation identifier is identified.

12. The method as claimed in claim 1, wherein during said providing the automation device is provided as a new device and the automation device is incorporated into the cluster during an on-boarding process, and a node identifier is assigned to the automation device in the course of the on-boarding process, or the node identifier is assigned subsequently.

13. The method as claimed in claim 12, wherein said automation device is incorporated into the cluster during an on-boarding process by the central cluster management unit.

14. The method as claimed in claim 1, wherein during said query a request is made to the central cluster management unit which is responsible for distributing workloads among the nodes of the cluster.

15. A computer program comprising program code for performing the method as claimed in claim 1.

16. An automation device for allocation to a node identifier, said automation device comprising:
   a device manager;
   wherein the device manager:
      monitors whether an automation identifier is allocated to the automation device;
      queries a central cluster management unit, in an event that the allocation thereof is identified, to determine whether a description object comprising the automation identifier allocated when considering a description object as a description object of the automation device already exists in a cluster state database associated with the cluster in which the device participates or is intended to participate as a node and containing description objects for nodes of the cluster, possibly for a node identifier other than the one allocated to the automation device; and
      generates a description object comprising the automation identifier for a node identifier allocated to the automation device in the cluster state database or stores the automation identifier in a description object which already exists for a node identifier allocated to the automation device in the database in an event that no such description object yet exists or in an event that such a description object exists but is declared as inactive.

17. The automation device as claimed in claim 16, wherein the automation device is allocated at least one containerized automation function with recourse to a description object stored in a cluster state database associated with the cluster in which the automation device participates or is intended to participate as the node.

18. A non-transitory computer-readable medium encoded with program instructions which, when executed by a processor on at least one computer, prompt the at least one computer to automatically configuring an industrial automation device, the program instructions comprising:
   a) program code for providing an automation device which is suitable for functioning as a node of a cluster and for executing at least one automation task;
   b) program code for monitoring, by a device manager, whether an automation identifier is allocated to the automation device;
   c) program code for querying, by the device manager, upon identifying such an allocation, a central cluster management unit to determine whether a description object already exists in a cluster state database associated with the cluster and containing description objects for nodes of the cluster, said description object storing the automation identifier allocated to the automation device;
   d) program code for considering the description object as a description object of the automation device in an event such a description object already exists for a node identifier allocated to the automation device; and
   e) program code for generating, by the device manager, a description object in the cluster state database for the node identifier allocated to the automation device in the event that such a description object exists for a node identifier other than the description object allocated to the automation device and is declared as inactive and in the event that no such description object yet exists, said description object one of (i) storing the automation identifier allocated to the automation device, (ii) storing the automation identifier allocated to the automation device in a description object (which already exists for a node identifier allocated to the automation device in the cluster state database and (iii) initiating the storage or the generation.

\* \* \* \* \*